(12) United States Patent
Yasuma

(10) Patent No.: US 8,638,803 B2
(45) Date of Patent: Jan. 28, 2014

(54) COMMUNICATION APPARATUS AND COMMUNICATION METHOD FOR PREVENTING A COMMUNICATION APPARATUS FROM RECEIVING AN UNINTENDED PACKET

(75) Inventor: Kensuke Yasuma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 281 days.

(21) Appl. No.: 12/852,239

(22) Filed: Aug. 6, 2010

(65) Prior Publication Data

US 2011/0038379 A1 Feb. 17, 2011

(30) Foreign Application Priority Data

Aug. 17, 2009 (JP) ................................. 2009-188603

(51) Int. Cl.
*H04L 12/28* (2006.01)

(52) U.S. Cl.
USPC .......................................... 370/401; 370/392

(58) Field of Classification Search
USPC ........................... 370/401, 465–467, 474–476
See application file for complete search history.

(56) References Cited

U.S. PATENT DOCUMENTS

| | | | |
|---|---|---|---|
| 7,522,618 B2 * | 4/2009 | Hamamoto et al. ........... | 370/401 |
| 7,644,164 B2 * | 1/2010 | Saiki et al. .................... | 709/227 |
| 7,886,062 B2 * | 2/2011 | Oguchi et al. ................. | 709/228 |
| 2004/0218614 A1 | 11/2004 | Yokomitsu et al. | |
| 2005/0021603 A1 * | 1/2005 | Yokomitsu et al. ........... | 709/203 |
| 2007/0189295 A1 * | 8/2007 | Hamamoto et al. .......... | 370/392 |
| 2007/0255784 A1 | 11/2007 | Takechi et al. | |
| 2008/0225866 A1 * | 9/2008 | Sehgal et al. ................. | 370/401 |
| 2008/0289009 A1 * | 11/2008 | Lee et al. .......................... | 726/4 |

FOREIGN PATENT DOCUMENTS

| | | |
|---|---|---|
| CN | 1913462 A | 2/2007 |
| CN | 1969507 A | 5/2007 |
| CN | 101218790 A | 7/2008 |
| JP | 2004-328027 A | 11/2004 |
| JP | 2005-346608 A | 12/2005 |
| WO | 2006/006683 A1 | 1/2006 |

* cited by examiner

*Primary Examiner* — Hassan Phillips
*Assistant Examiner* — Saba Tsegaye
(74) *Attorney, Agent, or Firm* — Canon USA Inc. IP Division

(57) ABSTRACT

A communication apparatus in a second network, connected to a relay apparatus configured to relay a packet from a first network to the second network according to destination information of the packet from the first network, includes a receiving unit configured to receive identification information set to the communication apparatus, a processing unit configured to perform processing for enabling data provision to the first network, and a transmission unit configured to transmit to the relay apparatus, before data provision to the first network is enabled by the processing unit, a deletion request for deleting a destination information setting for relaying the packet from the first network to a destination specified by the received identification information.

17 Claims, 6 Drawing Sheets

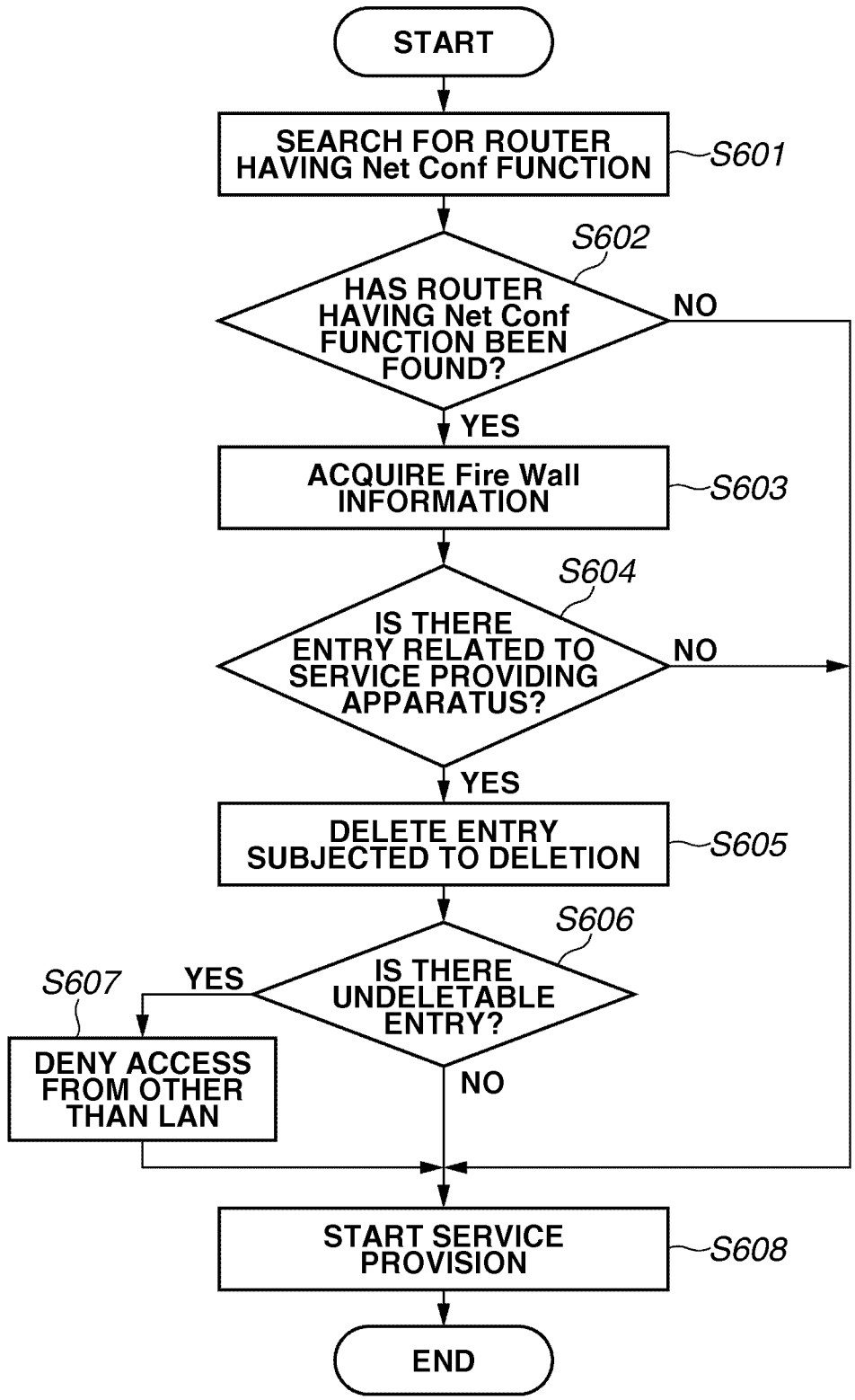

COMMUNICATION APPARATUS AND COMMUNICATION METHOD FOR PREVENTING A COMMUNICATION APPARATUS FROM RECEIVING AN UNINTENDED PACKET

BACKGROUND OF THE INVENTION

1. Field of the Invention

The present invention relates to a communication method performed by a communication apparatus connected to a network.

2. Description of the Related Art

An internet gateway device (IGD) having the Universal Plug and Play (UPnP) function is capable of performing port mapping (UPnP Forum http://www.upnp.org/). A relay apparatus performing port mapping adds a port mapping entry upon reception of AddPortMapping. The port mapping entry includes, for example, a destination port number of a packet received by the relay apparatus from an external network, and an IP address and a port number of a communication apparatus of a destination network. The relay apparatus relays the packet received from, for example, an external network to the communication apparatus of an internal network based on the port mapping information.

Japanese Patent Application Laid-Open No. 2005-346608 discusses a technique for deleting a port mapping entry by using DeletePortMapping when disconnecting a session of a device which has transmitted AddPortMapping. Japanese Patent Application Laid-Open No. 2004-328027 discusses a technique in which a relay apparatus configured to relay a packet based on port mapping deletes from a port mapping table an entry that remains unupdated for a predetermined time period.

However, there may be a situation of receiving an unintended packet depending on identification information used by the communication apparatus.

For example, a communication apparatus 1 having acquired an IP address 1 (internal address 1) of the internal network adds to the relay apparatus an entry having a destination port number of a packet from an external network, and the internal address 1 and a port number of a destination network. The internal address (local address) is an IP address used in the internal network.

Subsequently, the communication apparatus 1 may unintentionally terminate a session, for example, due to changes of communication environment. When the communication apparatus 1 terminates a session without deleting the entry by using DeletePortMapping and another communication apparatus 2 acquires the internal address 1 and starts communication, an unintended packet from an external network may be relayed to the communication apparatus 2.

SUMMARY OF THE INVENTION

The present invention is directed to a communication method for preventing a communication apparatus from receiving an unintended packet.

According to an aspect of the present invention, a communication apparatus in a second network, connected to a relay apparatus configured to relay a packet from a first network to the second network according to destination information of the packet from the first network, includes a receiving unit configured to receive identification information set to the communication apparatus, a processing unit configured to perform processing for enabling data provision to the first network, and a transmission unit configured to transmit to the relay apparatus, before data provision to the first network is enabled by the processing unit, a deletion request for deleting a destination information setting for relaying the packet from the first network to a destination specified by the received identification information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a flowchart illustrating service provision start processing by a communication apparatus according to a third exemplary embodiment of the present invention.

DESCRIPTION OF THE EMBODIMENTS

Various exemplary embodiments, features, and aspects of the invention will be described in detail below with reference to the drawings.

Figure 1:
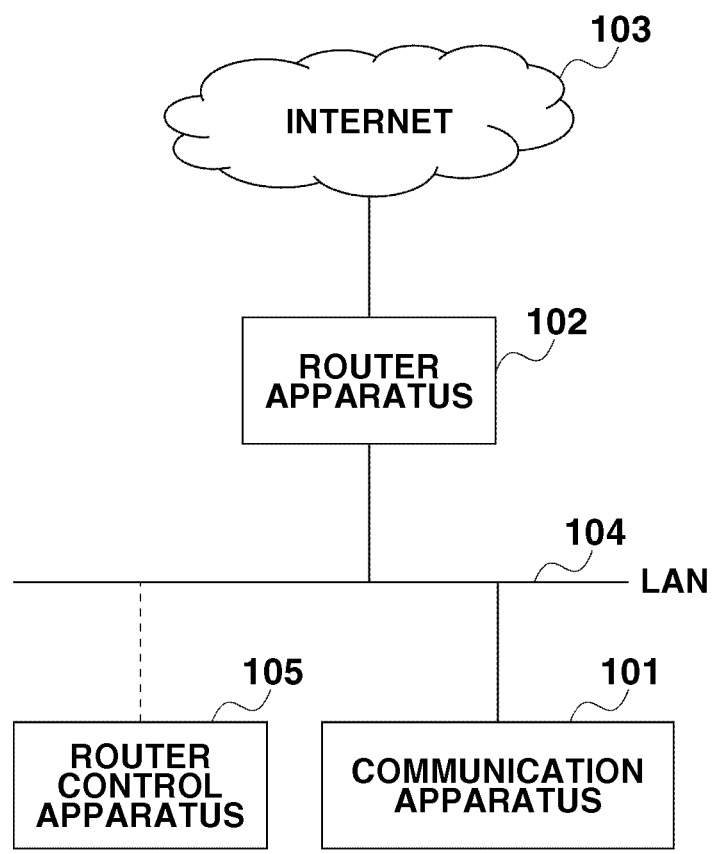
FIG. 1 illustrates a configuration of a network according to a first exemplary embodiment of the present invention.

FIG. 1 illustrates a configuration of a network according to an exemplary embodiment of the present invention.

A communication apparatus (service providing apparatus) 101 is a communication apparatus (service providing apparatus) which connects to a local area network (LAN) 104 to provide services via the LAN 104.

A router apparatus 102 connects to the Internet 103 (first network) and the LAN 104 (second network) to release the IGD function to the LAN 104. That is, the router apparatus 102 stores port mapping information. The port mapping information associates the destination port number (destination information) of a packet from the Internet 103 (first network) with identification information (IP address) and port number of the communication apparatus of the destination LAN 104 (second network). In the present exemplary embodiment, an entry refers to a combination of the destination port number of a packet from the Internet 103, and the identification information and the port number of the communication apparatus on the LAN 104. The router apparatus 102 relays a packet from the Internet 103 to the LAN 104 (second network) based on the destination port number (destination information) of the packet from the Internet 103 (first network). The IP address (identification information) obtained by the communication apparatus according to the present exemplary embodiment is an internal address used for the LAN 104.

The Internet 103 includes external networks. The Internet 103 is not limited to the Internet but may be a combination of a LAN and a wide area network (WAN). The LAN 104 is not limited to a LAN but may be a communication path that can use IP such as Bluetooth or a combination of communication paths.

A router control apparatus 105 can transmit to the router apparatus 102 a message for adding a port mapping entry. Before the communication apparatus 101 is connected to the LAN 104, the router control apparatus 105 according to the present exemplary embodiment connects to the LAN 104 to acquire identification information (internal address 1). Then, the router control apparatus 105 transmits to the router apparatus 102 an AddPortMapping SOAP message for adding a port mapping entry. AddPortMapping is a message for requesting the router apparatus 102 to add, upon reception of a packet having port number 1, an entry for relaying the packet to port number 2 of the internal address 1 of the LAN 104. Upon reception of AddPortMapping, the router apparatus 102 adds a corresponding entry.

The port number 1 and the port number 2 may be either identical or different. It is assumed that, before the communication apparatus 101 is connected to the LAN 104, the router control apparatus 105 has transmitted AddPortMapping to the router apparatus 102 and has been disconnected from the LAN 104.

Figure 2:
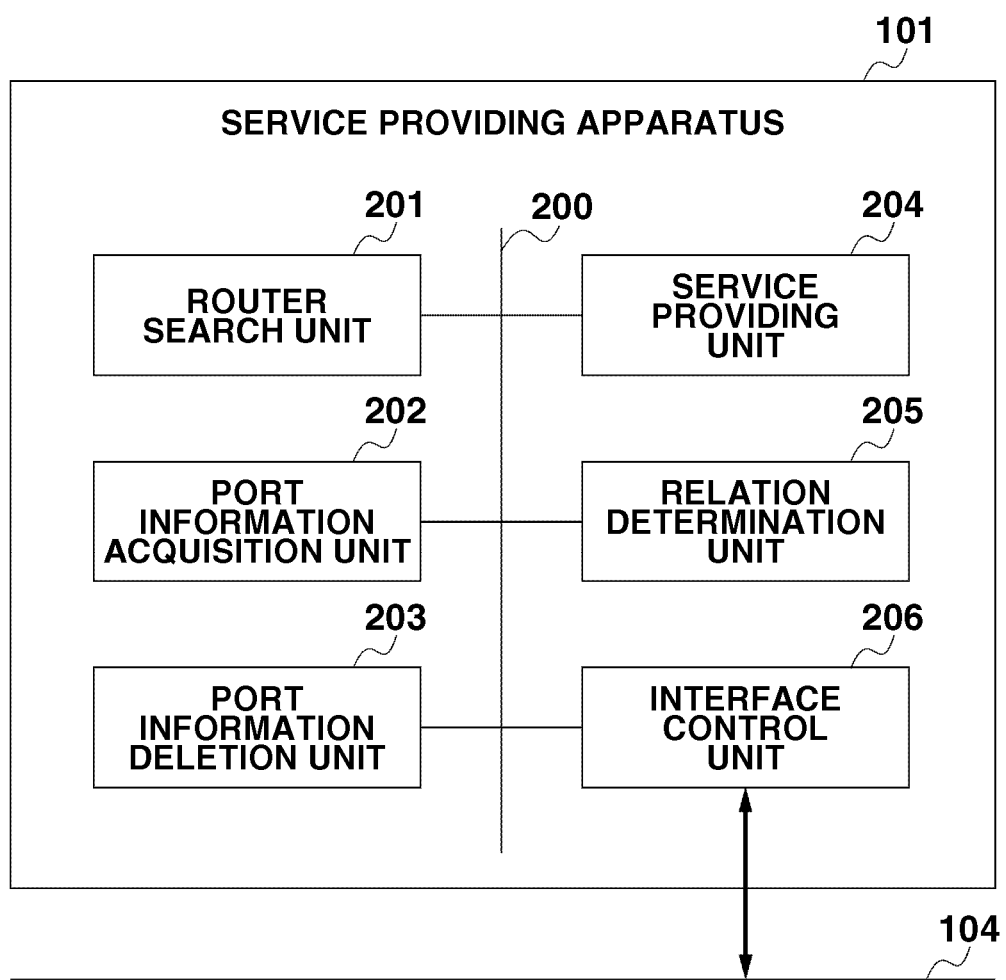
FIG. 2 illustrates a module configuration of a communication apparatus according to the first exemplary embodiment.

FIG. 2 illustrates a module configuration of the communication apparatus 101. The communication apparatus 101 includes a bus 200, a router search unit 201, a port information acquisition unit 202, a port information deletion unit 203, a service providing unit 204, a relation determination unit 205, and an interface control unit 206. The bus 200 connects all the units.

The router search unit 201 searches for a router apparatus having the IGD function by using the Simple Service Discovery Protocol (SSDP). Although SSDP is used in the present exemplary embodiment, the discovery protocol is not limited thereto but may be a search by directory service or other discovery protocols based on multicast and broadcast.

The port information acquisition unit 202 generates a message for acquiring port mapping information from a router apparatus found by the router search unit 201. The port information acquisition unit 202 generates a GetPortGenericMapping SOAP message for acquiring a port mapping entry from the router apparatus, and transmits it to the router apparatus 102 via the interface control unit 206. Upon reception of GetPortGenericMapping, the router apparatus 102 notifies the communication apparatus 101 of an entry corresponding to an index value contained in the received GetPortGenericMapping.

Further, the port information acquisition unit 202 generates a PortMappingNumberOfEntries SOAP message for acquiring the number of entries to be set in the router apparatus, and transmits it to the router apparatus 102 via the interface control unit 206. Upon reception of PortMappingNumberOfEntries, the router apparatus 102 notifies the communication apparatus 101 of the number of port mapping entries set in the router apparatus 102 itself. Although a SOAP message is used to acquire port mapping information in the present exemplary embodiment, this function can also be achieved by using other TCP- or UDP-based messages.

The port information deletion unit 203 generates a message for deleting port mapping information from the router apparatus found by the router search unit 201. The port information deletion unit 203 generates a DeletePortMapping SOAP message for deleting a specified entry from the port mapping table, and transmits it to the router apparatus 102 via the interface control unit 206. Upon reception of DeletePortMapping, the router apparatus 102 deletes the corresponding entry from the port mapping table. Although a SOAP message is used to delete port mapping information in the present exemplary embodiment, this function can also be achieved by using other TCP- or UDP-based messages.

The service providing unit 204 releases and provides the server function (HTTPd) of HTTP services via the LAN 104. Although services are denoted by the HTTP in the present exemplary embodiment, the protocol is not limited thereto but may be the FTP and other protocols, or an application having the server function. The service providing unit 204 can provide services to devices in the LAN 104 as well as devices connected to the Internet 103. Specifically, the service providing unit 204 performs processing (service provision start processing) for enabling data provision to the Internet (first network). Upon reception of a service request after completion of the service provision start processing, the service providing unit 204 starts service provision to the source of the service request.

The interface control unit 206 performs transmission and reception of SSDP and SOAP messages of the router search unit 201, the port information acquisition unit 202, the port information deletion unit 203, and the service providing unit 204 via the LAN 104. Specifically, the interface control unit 206 transmits messages generated by the router search unit 201, the port information acquisition unit 202, the port information deletion unit, and the service providing unit 204.

Further, the interface control unit 206 receives identification information (internal address) to be set in the interface control unit 206 itself. The interface control unit 206 may acquire this internal address from other apparatuses in charge of address management by using the Dynamic Host Configuration Protocol (DHCP) when connected to the LAN 104, or via a user input.

The relation determination unit 205 determines whether a port mapping entry to be set in the router apparatus 102 is related to the communication apparatus 101. Specifically, the relation determination unit 205 determines whether there is an entry set for relaying a packet from the Internet 103 to the internal address received by the communication apparatus 101.

Although port mapping based on the IGD function has specifically been described in the present exemplary embodiment, port mapping is not limited thereto but may be based on the Netconf function to operate information such as Fire Wall.

The service provision start processing by the communication apparatus 101 will be described below. Although the service provision start processing is performed before the communication apparatus 101 starts service provision to the LAN 104 in the present exemplary embodiment, the processing may be performed, for example, when the communication apparatus 101 is connected to the LAN 104 and acquires an internal address.

Further, the present exemplary embodiment will be described below based on a case where the router control apparatus 105 remains connected to the LAN 104 until the time immediately before the communication apparatus 101 connects to the LAN 104. Further, the following describes a case where the identification information received by the communication apparatus 101 coincides with identification information obtained when the router control apparatus 105 was connected to the LAN 104, i.e., the internal address 1.

Figure 3:
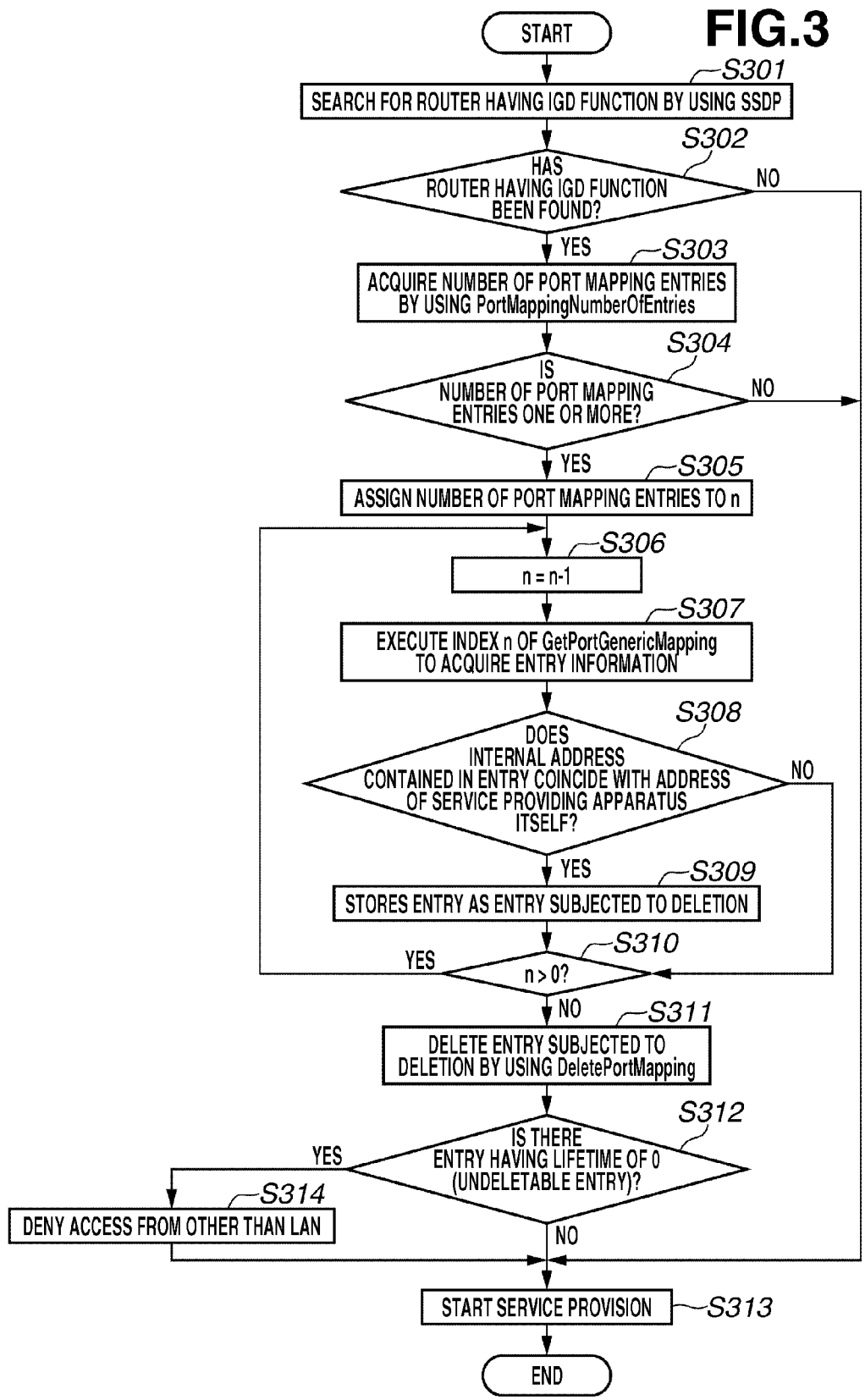
FIG. 3 is a flowchart illustrating service provision start processing by the communication apparatus according to the first exemplary embodiment.

FIG. 3 is a flowchart illustrating service provision start processing by the communication apparatus (service providing apparatus) 101. The interface control unit 206 of the communication apparatus 101 sets the internal address of the LAN 104 in the interface control unit 206 itself before starting the processing illustrated in FIG. 3. Specifically, the interface control unit 206 receives identification information (internal address) to be set in the interface control unit 206 itself before step S301 of FIG. 3 (reception procedure).

In step S301, the router search unit 201 transmits to the router apparatus 102 via the interface control unit 206 a message for searching for a router apparatus having the IGD function by using the SSDP, and the processing proceeds to step S302.

In step S302, the router search unit 201 determines whether a router apparatus having the IGD function has been found based on a response to the message transmitted in step S301. If the router search unit 201 determines that a router apparatus having the IGD function has been found, the processing proceeds to step S303. If the router search unit 201 determines that a router apparatus having the IGD function has not been found, the processing proceeds to step S313. In the present exemplary embodiment, the router apparatus 102 is found and the processing proceeds to step S303.

In step S303, the port information acquisition unit 202 transmits IGD's PortMappingNumberOfEntries SOAPAction to the router apparatus 102 via the interface control unit 206. Specifically, the port information acquisition unit 202 generates a message for acquiring the number of port mapping entries. Then, the interface control unit 206 transmits to the router apparatus 102 a message (PortMappingNumberOfEntries) for acquiring the number of entries, generated by the port information acquisition unit 202. Upon reception of PortMappingNumberOfEntries from the communication apparatus 101, the router apparatus 102 notifies the communication apparatus 101 of the number of port mapping entries. When the port information acquisition unit 202 acquires the number of port mapping entries from the router apparatus 102, the processing proceeds to step S304. In the present exemplary embodiment, since two entries are added to the router apparatus 102 by the router control apparatus 105, the port information acquisition unit 202 acquires "2" as the number of port mapping entries, and the processing proceeds to step S304. However, the number of port mapping entries is not limited to 2.

In step S304, the port information acquisition unit 202 determines whether the number of port mapping entries acquired from the router apparatus 102 is one or more. If the port information acquisition unit 202 determines that the number of port mapping entries is one or more, the processing proceeds to step S305. If the port information acquisition unit 202 determines that the number of port mapping entries is not one or more (determines that it is 0), the processing proceeds to step S313. In the present exemplary embodiment, the port information acquisition unit 202 determines that the number of port mapping entries is one or more, and the processing proceeds to step S305.

In step S305, the port information acquisition unit 202 assigns the number of port mapping entries acquired to n, and the processing proceeds to step S306. In the present exemplary embodiment, the port information acquisition unit 202 assigns 2 to n, and the processing proceeds to step S306. In step S306, the port information acquisition unit 202 assigns the value of n−1 to n, and the processing proceeds to step S307. In the present exemplary embodiment, the port information acquisition unit 202 assigns 1 to n, and the processing proceeds to step S307.

In step S307, the port information acquisition unit 202 transmits IGD's GetPortGenericMapping SOAPAction having an index of n to the router apparatus 102 via the interface control unit 206. Specifically, the port information acquisition unit 202 generates a message (GetPortGenericMapping) for acquiring information about a port mapping entry. Then, the interface control unit 206 transmits to the router apparatus 102 a message for acquiring entry information, generated by the port information acquisition unit 202.

In the present exemplary embodiment, the port information acquisition unit 202 generates a GetPortGenericMapping having an index of 1. Then, the interface control unit 206 transmits GetPortGenericMapping generated by the port information acquisition unit 202 to the router apparatus 102. Upon reception of GetPortGenericMapping having an index of 1 from the communication apparatus 101, the router apparatus 102 notifies the communication apparatus 101 of the information about an entry having an index of 1 among port mapping entries.

Specifically, the port information acquisition unit 202 generates a mapping acquisition request (GetPortGenericMapping) for acquiring entry information from the router apparatus 102. Then, the interface control unit 206 transmits to the router apparatus 102 a mapping acquisition request generated by the port information acquisition unit 202. An entry is association information which associates the destination information (destination port number) of a packet from the Internet 103 (first network) with the identification information (internal address) of the communication apparatus of the LAN 104 (second network). When the port information acquisition unit 202 acquires a port mapping entry corresponding to an index of n from the router apparatus 102, the processing proceeds to step S308.

In step S308, the port information acquisition unit 202 requests the relation determination unit 205 to determine whether the acquired port mapping entry is related to the communication apparatus 101. The relation determination unit 205 determines whether the destination address (identification information) contained in the port mapping entry coincides with the address retained by the communication apparatus 101. If the relation determination unit 205 determines that the two addresses coincides with each other, the processing proceeds to step S309. If the relation determination unit 205 determines that the two addresses are different, the processing proceeds to step S310. In the present exemplary embodiment, since the destination address contained in the acquired port mapping entry coincides with the address retained by the communication apparatus 101, i.e., the internal address 1, the relation determination unit 205 determines that the two addresses coincide with each other, and the processing proceeds to step S309.

In step S309, the port information acquisition unit 202 stores the port mapping entry determined to be identical in step S308 as an entry subjected to deletion, and the processing proceeds to step S310. Specifically, the port information acquisition unit 202 determines a setting to be deleted based on the acquired port mapping entry. In the present exemplary embodiment, the port information acquisition unit 202 stores an entry having an index of 1 as an entry subjected to deletion, and the processing proceeds to step S310.

In step S310, the port information acquisition unit 202 determines whether n is larger than 0. If the port information acquisition unit 202 determines that n is larger than 0, the processing proceeds to step S306. If the port information acquisition unit 202 determines that n is not larger than 0, the processing proceeds to step S311. In the present exemplary embodiment, since n=1, the port information acquisition unit 202 determines that n is larger than 0, and the processing returns to step S306.

In step S306, the port information acquisition unit 202 assigns the value of n−1 to n. In this case, 0 is assigned to n, and the processing proceeds to step S307. In step S307, the port information acquisition unit 202 transmits GetPortGenericMapping having an index of 0 to the router apparatus 102 via the interface control unit 206. Then, the port information acquisition unit 202 acquires the information about an entry having an index of 0.

The destination address contained in an entry having an index of 0 coincides with the address retained by the communication apparatus 101, i.e., the internal address 1. In step S309, the port information acquisition unit 202 stores an entry having an index of 0 is an entry subjected to deletion. In step S310, the port information acquisition unit 202 determines that n is not larger than 0, and the processing proceeds to step S311.

In step S311 (transmitting procedure), the port information acquisition unit 202 notifies the port information deletion unit 203 of the information about the port mapping entry stored as an entry subjected to deletion. The port information acquisition unit 202 according to the present exemplary embodiment notifies the port information deletion unit 203 that entries having an index of 1 and 0 are entries subjected to deletion. The port information deletion unit 203 determines whether the lifetime of each of the entries subjected to deletion, notified by the port information acquisition unit 202, is 0. Information about the lifetime is included in the entries acquired by the port information acquisition unit 202. It is assumed that, in the present exemplary embodiment, the lifetime of each of the entries having an index 0 and 1 is not 0.

The port information deletion unit 203 requests deletion of only entries having a lifetime of not 0 among entries subjected to deletion. In step S311, the port information deletion unit 203 transmits IGD's DeletePortMapping SOAPAction to the router apparatus 102 via the interface control unit 206 to request the router apparatus 102 to delete relevant port mapping entries.

In the present exemplary embodiment, the port information deletion unit 203 generates a deletion request (DeletePortMapping) for deleting an entry having an index of 0 or 1. Then, the interface control unit 206 transmits the deletion request generated by the port information deletion unit 203 to the router apparatus 102. Upon reception of the deletion request (DeletePortMapping) for deleting an entry having an index of 0 or 1, the router apparatus 102 deletes entries having an index of 0 or 1.

Specifically, the interface control unit 206 transmits to the router apparatus 102 a deletion request for deleting a destination port number (destination information) setting for relaying a packet from the Internet 103 to a destination specified by the received identification information (internal address 1). The interface control unit 206 transmits the deletion request (DeletePortMapping) before data provision is enabled through the service provision start processing by the service providing unit 204 in step 313. When DeletePortMapping has been transmitted from the interface control unit 206 for all entries subjected to deletion, the processing proceeds to step S312.

The port information deletion unit 203 requests deletion of only entries having a lifetime of not 0 for the following reason: in the present exemplary embodiment, since an entry having a lifetime of 0 is a default setting of the router apparatus 102, it is undeletable by using DeletePortMapping from the communication apparatus 101. Therefore, based on the lifetime (deletability information), the port information deletion unit 203 determines an entry which is undeletable by the deletion request among the entries determined to be subjected to deletion in step S309. Then, the port information deletion unit 203 requests deletion of only entries determined to be deletable with reference to the lifetime.

In step S312, the port information deletion unit 203 determines whether there is an entry having a lifetime of 0 (undeletable entry). If the port information deletion unit 203 determines that there is an entry having a lifetime of 0, the processing proceeds to step S314. If the port information deletion unit 203 determines that there is no entry having a lifetime of 0, the processing proceeds to step S313. In the present exemplary embodiment, the port information deletion unit 203 determines that there is no entry having a lifetime of 0, and the processing proceeds to step S313.

In step S313 (processing procedure), the service providing unit 204 activates HTTPd to start service provision via the LAN 104, and terminates the service provision start processing. Specifically, in step S313, the service providing unit 204 performs processing (service provision start processing) for enabling data provision to the Internet 103 (first network). When the service providing unit 204 completes the service provision start processing, the service provision start processing ends.

In step S314, the service providing unit 204 activates the function for denying (ignoring) access from networks other than the LAN 104 (Internet 103), and the processing proceeds to step S313. Specifically, in step S314, the service providing unit 204 denies reception of a packet having a destination information setting determined to be undeletable by the deletion request among the destination information (destination port number) associated with the received identification information (internal address 1). Performing processing in this way can disable a packet from an unintended remote apparatus even if an entry is undeletable.

Figure 4:
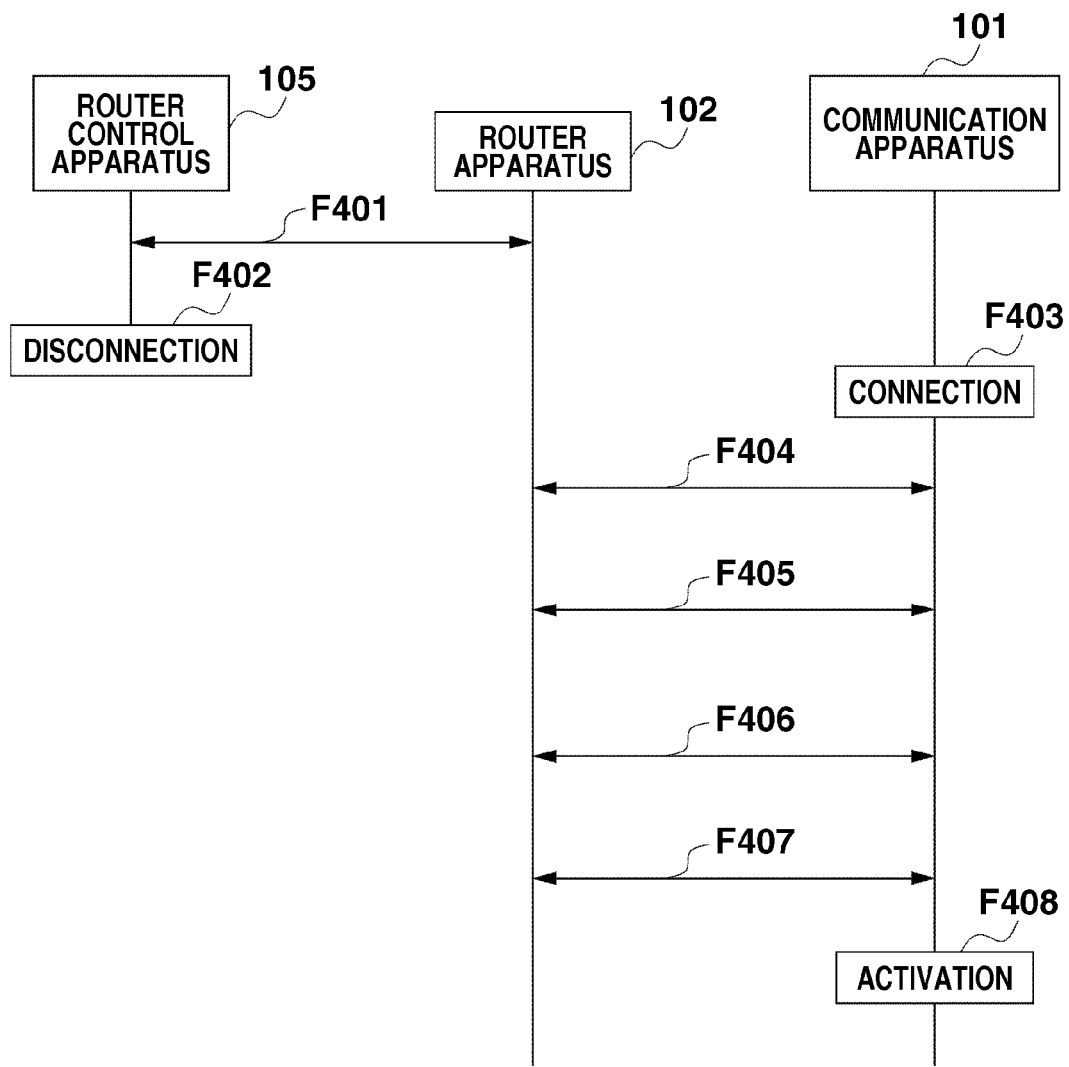
FIG. 4 is a sequence diagram illustrating a message flow according to the first exemplary embodiment.

FIG. 4 is a sequence diagram illustrating messages and processing flows.

In step F401, the router control apparatus 105 adds a port mapping entry to the router apparatus 102 by using IGD's AddPortMapping SOAPAction. It is assumed that the entry to be added has internal address 192.168.0.2 (internal address 1), port number 4000, and a lifetime of 3600. After the processing for adding an entry, upon reception of a packet having destination port number 4000 from the Internet 103, the router apparatus 102 relays the packet to port number 4000 of the router control apparatus 105 of the LAN 104. However, the destination port number of the packet from the Internet 103 may not coincide with the destination port number of the LAN 104. The router control apparatus 105 retains internal address 192.168.0.2 (internal address 1), activates HTTPd with port number 4000 to start service provision.

In step F402, the router control apparatus 105 disconnects from the LAN 104. In this case, the router control apparatus 105 disconnects from the LAN 104 without deleting the entry added by the router control apparatus 105 itself.

In step F403, the communication apparatus 101 is connected to the LAN 104. The interface control unit 206 of the communication apparatus 101 receives an unused address 192.168.0.2 (internal address 1) from the router apparatus 102 by using the DHCP. The internal address can also be received as a user-input value. The communication apparatus 101 sets the received the internal address 1 to the interface. Specifically, the interface control unit 206 receives identification information (internal address 1) to be set to the interface control unit 206 itself.

When the internal address 1 has been set in step F403, then in step F404, the router search unit 201 searches for a router apparatus having the IGD function by using the SSDP. The router search unit 201 receives a response from the router apparatus 102, and knows that the router apparatus 102 has the IGD function. When the router search unit 201 finds a router apparatus having the IGD function, the processing proceeds to step F405.

In step F405, the port information acquisition unit 202 acquires the number of port mapping entries from the router apparatus 102 by using PortMappingNumberOfEntries SOAPAction. In this example, since the router apparatus 102 retains one port mapping entry (having internal address 192.168.0.2, port number 4000, a lifetime of 3600) set by the router control apparatus 105, it returns 1 as the number of port mapping entries. When the port information acquisition unit 202 acquires the number of port mapping entries of the router apparatus 102, the processing proceeds to step F406.

In step F406, the port information acquisition unit 202 acquires the information about a port mapping entry from the router apparatus 102 by using GetPortGenericMapping SOAPAction. In this example, the port information acquisition unit 202 acquires from the router apparatus 102 information about an entry having internal address 192.168.0.2, destination port number 4000 of a packet from the Internet 103, port number 4000 of the destination of the LAN 104, and a lifetime of 3600. When the port information acquisition unit 202 acquires the entry information, the processing proceeds to step F407.

In step F407, the port information acquisition unit 202 compares the destination address contained in the port mapping entry acquired in step F406 with the address received by the interface control unit 206. In the present exemplary embodiment, the destination address contained in the entry is identical to the address received by the interface control unit 206, i.e., the internal address 1 (192.168.0.2). When the two addresses are identical to each other as a result of comparison, the port information acquisition unit 202 determines that the port mapping entry is related to the communication apparatus 101, and checks the lifetime. In the present exemplary embodiment, the lifetime contained in the port mapping entry is assumed to be 1200 (although it was 3600 when set in step F401, a lifetime of 2400 has elapsed). The communication apparatus 101 determines that there is an entry corresponding to the internal address of the communication apparatus 101 itself and is deletable, and deletes the port mapping entry retained by the router apparatus 102 by using DeletePortMapping SOAPAction.

Although the present exemplary embodiment has specifically been described based on a case where an entry having an address identical to the internal address of the communication apparatus 101 is deleted, the condition for deletion is not limited thereto. For example, not only on an internal address basis, it is also possible to delete only port mapping entries having a destination port number identical to the port number of the service to be started by the communication apparatus 101. In step F407, the interface control unit 206 transmits DeletePortMapping containing indices of all entries to be deleted, and the processing proceeds to F408.

In step F408, the service providing unit 204 activates HTTPd (starts service) to start service provision.

Although the router apparatus 102 manages the internal address of the LAN 104 in the present exemplary embodiment, the apparatus which performs address management is not limited thereto but may be other apparatuses. Further, it is also possible to assign a fixed internal address to the router control apparatus 105 and the communication apparatus 101 or manually assign an internal address thereto, instead of performing address management. Further, the internal address of an entry requested to be added by the router control apparatus 105 may or may not be identical to the internal address set in the router control apparatus 105.

As described above, the interface control unit 206 of the communication apparatus according to the present exemplary embodiment receives the identification information (internal address 1) to be set in the interface control unit 206 itself. Further, the service providing unit 204 performs processing (service provision start processing) for enabling data provision to the Internet 103 (first network). Then, the interface control unit 206 transmits to the router apparatus 102, before data provision is enabled through the service provision start processing by the service providing unit 204, the deletion request (DeletePortMapping) for deleting a predetermined entry. Specifically, the interface control unit 206 transmits to the router apparatus 102 the deletion request for deleting a setting for relaying the packet from the Internet 103 to the received internal address 1.

Performing processing in this way enables reducing unnecessary accesses to the communication apparatus which provides services to different network devices.

A second exemplary embodiment of the present invention will be described below centering on differences from the first exemplary embodiment.

The second exemplary embodiment uses the IPv6 (2001:0:0:1::2) address format. The first exemplary embodiment uses the IPv4 address format. The IPv6 address format will be described below.

Figure 5:
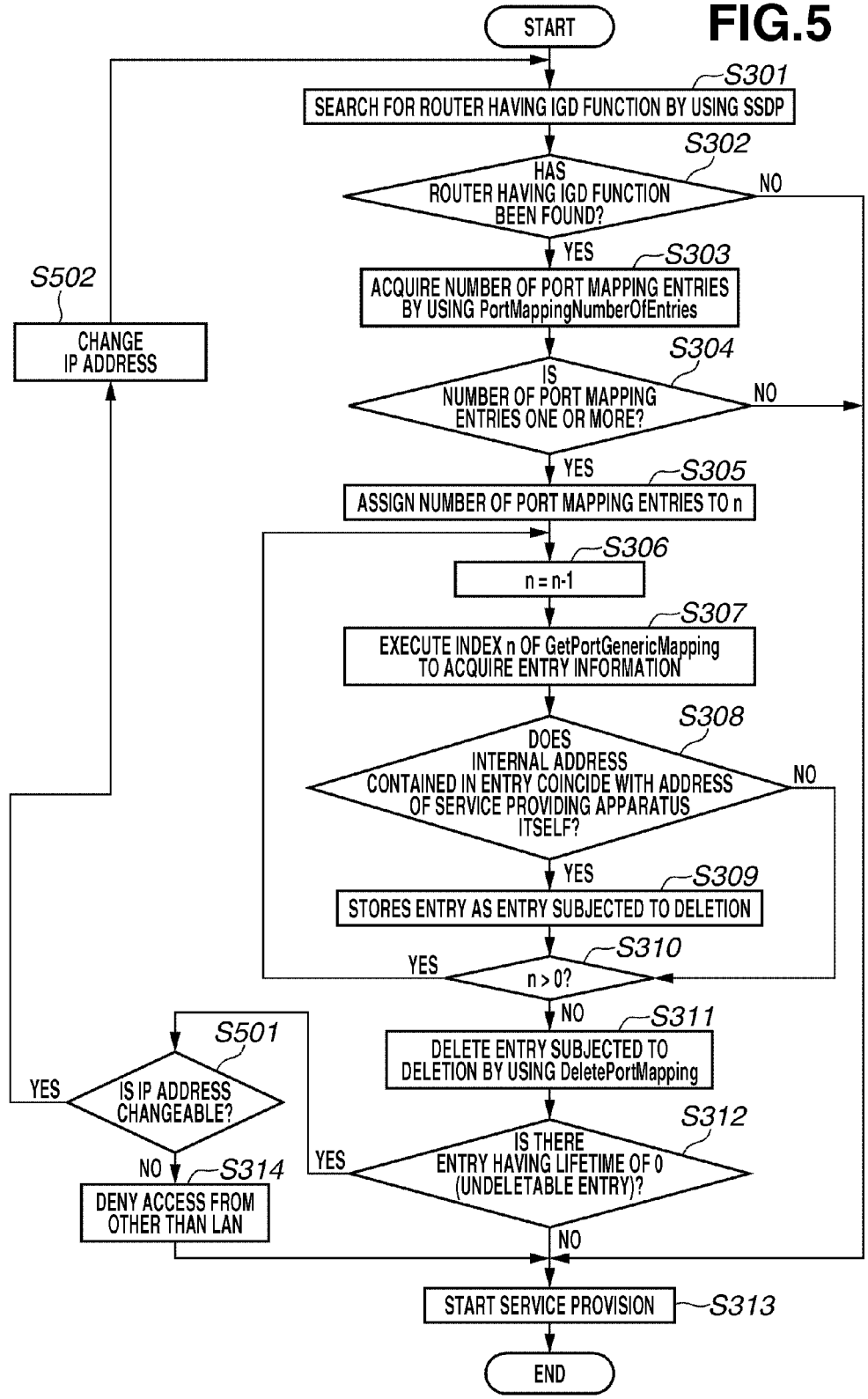
FIG. 5 is a flowchart illustrating service provision start processing by a communication apparatus according to a second exemplary embodiment of the present invention.

FIG. 5 is a flow chart illustrating service provision start processing by the communication apparatus 101 according to the second exemplary embodiment. The communication apparatus 101 may perform the processing illustrated in FIG. 5 when it connects to the LAN 104 and acquires the IP address. Processing in steps S301 to S314 is similar to that of FIG. 3. The interface control unit 206 receives the identification information (IP address) to be set in the interface control unit 206 itself before step S301 of FIG. 5 (reception procedure). It is assumed that the interface control unit 206 according to the present exemplary embodiment has received the IP address 1 (2001:0:0:1::2).

In step S501, the service providing unit 204 inquires of the interface control unit 206 whether the IP address is changeable. Specifically, when the router apparatus 102 has a port mapping entry having a destination IP address identical to the IP address received by the interface control unit 206 and a lifetime of not 0, the service providing unit 204 inquires of the interface control unit 206 whether the IP address is changeable.

Upon reception of the inquiry from the service providing unit 204, the interface control unit 206 determines whether the IP address is changeable by using Stateless Address Autoconfiguration (RFC4862) of IPv6. If the interface control unit 206 determines that the IP address is changeable, the processing proceeds to step S502. If the interface control unit 206 determines that the IP address is not changeable, the processing proceeds to step S314.

In step S502, the interface control unit 206 changes the IP address by using Stateless Address Autoconfiguration of IPv6. In the present exemplary embodiment, the IP address 1 (2001:0:0:1::2) is changed to the IP address 2 (2001:0:0:1::3). When the interface control unit 206 has changed the IP address, the processing proceeds to step S301 to perform processing for determining and deleting an entry having the changed IP address.

Specifically, in step S307, the port information acquisition unit 202 transmits GetPortGenericMapping (mapping acquisition request) to the router apparatus 102 to acquire entry information from the router apparatus 102. The entry information according to the present exemplary embodiment associates the destination information (destination port number) of a packet from the Internet 103 (first network), the identification information (IP address) of the communication apparatus of the destination LAN 104 (second network), and the lifetime (deletability information).

In step S314, the service providing unit 204 determines whether there is destination information determined to be undeletable by DeletePortMapping among the destination information (destination port number) associated with the received identification information (IP address). If the service providing unit 204 determines that there is destination information determined to be undeletable, it performs control so that the interface control unit 206 receives another IP address.

Another IP address may be acquired by using the DHCP, or a user may input a new IP address in response to an error message displayed on a screen.

Otherwise, If the interface control unit 206 determines that the IP address is not changeable in step S501, the service providing unit 204 activates the function to deny access from the Internet 103 in step S314. In step S313, the service providing unit 204 performs service provision start processing. Specifically, when there is destination information (destination port number) associated with the received identification information (IP address 1) and the IP address 1 cannot be changed to other identification information (IP address 2), the service providing unit 204 denies reception of a packet having destination information associated with the IP address 1.

Although the IP address is changed in the present exemplary embodiment, a new IP address 2 may be obtained since a plurality of IP addresses may be used simultaneously with IPv6. In this case, setting for refusing access from other than the LAN 104 (Internet 103) is made for the existing IP address 1.

Although whether the IP address has been changed is checked in the present exemplary embodiment by using Stateless Address Autoconfiguration of IPv6, the basis of determination is not limited thereto but may be other methods such as the determination whether the IP address has been changed by executing the DHCP.

A third exemplary embodiment of the present invention will be described below centering on differences from the first exemplary embodiment. The first exemplary embodiment has specifically been described based on a case where the router apparatus 102 is operated via the IGD and port mapping entries are subjected to setting. The third exemplary embodiment will be described below based on a case where the router apparatus 102 is operated based on the Netconf function and Fire Wall is subjected to setting.

The router apparatus 102 is provided with the Netconf function and advertises the Netconf function and receives search by using the SSDP. Further, the router apparatus 102 implements the Fire Wall function based on configuration information to be described below. The third exemplary embodiment will be described below centering on a case where the configuration information is the IP address and Media Access Control (MAC) address.

Although Netconf is used in the third exemplary embodiment, the protocol is not limited thereto but may be other management protocols. The module configuration of the communication apparatus 101 according to the third exemplary embodiment will be described below with reference FIG. 2 centering on differences from the first exemplary embodiment. The router search unit 201 searches for a router apparatus having the Netconf function by using the SSDP.

The port information acquisition unit 202 acquires configuration information from the router apparatus by using <get-config> of Netconf. The relation determination unit 205 determines whether a configuration entry acquired by the port information acquisition unit 202 is related to the communication apparatus 101. When the relation determination unit 205 determines that the configuration entry acquired by the port information acquisition unit 202 is related to the communication apparatus 101, the relation determination unit 205 notifies the port information deletion unit 203 of an index of the entry determined to be related to the communication apparatus 101.

The port information deletion unit 203 generates <delete-config> (deletion request) of Netconf for deleting an entry having the index notified by the relation determination unit 205, and transmits it to the router apparatus 102 via the interface control unit 206.

FIG. 6 is a flow chart illustrating the service provision start processing by the communication apparatus 101 according to the third exemplary embodiment. The service provision start processing will be described below based on a case where the configuration information acquired from the router apparatus 102 is the IP address and MAC address. Specifically, the router apparatus 102 implements the Fire Wall function based on the IP address and the MAC address. When a combination of the source IP address, the destination IP address, and the destination MAC address of a packet from the Internet 103 coincides with a registered combination, the router apparatus 102 relays the packet to the LAN 104. Thus, the router apparatus 102 is a relay apparatus that relays a packet from the Internet 103 to the LAN 104 according to the destination information (IP address) of the packet from the Internet 103.

The interface control unit 206 of the communication apparatus 101 has received the identification information (IP address) to be set in the interface control unit 206 itself before step S601 of FIG. 6 (reception procedure). The IP address according to the present exemplary embodiment is an IPv6 address. In the present exemplary embodiment, the router control apparatus 105 remains connected to the LAN 104 until the time immediately before the communication apparatus 101 connects to the LAN 104. Further, the router control apparatus 105 has registered a combination of the source IP address 1 (IP address 2), the destination IP address 1 (IP address 1), and the destination MAC address 1 to the router apparatus 102. A case where the new IP address of the communication apparatus 101 connected to the LAN 104 is the IP address 1 will be described below.

In step S601, the router search unit 201 searches for a router apparatus having the Netconf function. The router search unit 201 transmits a message for searching for the Netconf function by using the SSDP, and the processing proceeds to step S602.

In step S602, the router search unit 201 determines whether a router apparatus having the Netconf function has been found, based on a response to the message transmitted in step S601. If the router search unit 201 determines that a router apparatus having the Netconf function has been found, the processing proceeds to step S603. If the router search unit 201 determines that a router apparatus having the Netconf function has not been found, the processing proceeds to step S608. In the present exemplary embodiment, the router apparatus 102 is found as a router apparatus having the Netconf function, and the processing proceeds to step S603.

In step S603, the port information acquisition unit 202 acquires the configuration information from the router apparatus 102 by using <get-config> of Netconf, and the processing proceeds to step S604. In the present exemplary embodiment, an entry (a combination of the source IP address 1, the destination IP address 1, and the destination MAC address 1) set by the router control apparatus 105 is acquired as configuration information.

In step S604, the relation determination unit 205 determines whether there is an entry related to the communication apparatus 101, based on the configuration information acquired in step S603. The relation determination unit 205 determines whether the destination IP address contained in the Fire Wall configuration information coincides with the IP address of the interface control unit 206. If the relation determination unit 205 determines that the two IP addresses are identical to each other, the relation determination unit 205 also determines that there is an entry related to the communication apparatus 101, and the processing proceeds to step S605. If the relation determination unit 205 determines that there is no configuration entry related to the communication apparatus 101, the processing proceeds to step S608.

In step S605 (transmitting procedure), the port information deletion unit 203 generates <delete-config> (deletion request) for deleting an entry related to the communication apparatus 101. Then, the interface control unit 206 transmits the deletion request generated by the port information deletion unit 203 to the router apparatus 102. Upon reception of <delete-config>, the router apparatus 102 deletes a configuration entry set for relaying a packet to the destination IP address 1.

Specifically, the interface control unit 206 transmits to the router apparatus 102 a deletion request for deleting a setting for causing the router apparatus 102 to relay a packet having destination information identical to the received IP address (IP address 1) to the LAN 104 (second network). The interface control unit 206 transmits this deletion request (<delete-config>) before data provision is enabled through the service provision start processing by the service providing unit 204 in step 608.

In step S605, when the interface control unit 206 transmits <delete-config> of Netconf, generated by the port information deletion unit 203, to the router apparatus 102, the processing proceeds to step S606. In step S606, the port information deletion unit 203 determines whether there is a configuration entry that is undeletable due to a static setting in the router apparatus 102. If the port information deletion unit 203 determines that there is an undeletable entry in the router apparatus 102, the processing proceeds to step S607. If the port information deletion unit 203 determines that there is no undeletable entry in the router apparatus 102, the processing proceeds to step S608.

In step S607, the service providing unit 204 makes setting for refusing access from networks other than the LAN 104 (Internet 103), and the processing proceeds to step S608. In step S608 (processing procedure), the service providing unit 204 activates HTTPd to start service provision via the LAN 104, and terminates the service provision start processing. Specifically, in step S608, the service providing unit 204 performs processing (service provision start processing) for enabling data provision to the Internet 103 (first network). When the service providing unit 204 completes the service provision start processing, the service provision start processing ends.

As described above, the interface control unit 206 of the communication apparatus 101 according to the present exemplary embodiment receives the identification information (IP address 1) to be set in the interface control unit 206 itself. Further, the service providing unit 204 performs processing (service provision start processing) for enabling data provision to the Internet 103 (first network). Then, the interface control unit 206 transmits to the router apparatus 102, before data provision is enabled through the service provision start processing by the service providing unit 204, a deletion request (<delete-config>) for deleting a predetermined entry. Specifically, the interface control unit 206 transmits to the router apparatus 102 the deletion request for deleting a setting for relaying a packet having destination information identical to the received IP address 1 to the LAN 104.

Performing processing in this way enables reducing unnecessary accesses to the communication apparatus which provides services to different network devices.

Although a configuration entry to be deleted is determined with reference to the IP address in the present exemplary embodiment, the basis of determination is not limited thereto but may be based on the MAC address. Further, it is also possible, when both the IP address and MAC address coincide with their respective counterparts, to delete the corresponding configuration entry. Although the above-mentioned description has been made based on a case where the configuration information is a combination of the IP address and the MAC address, the present invention can be embodied even in a case where other configuration information is used. For example, the present invention is also applicable to a case where the configuration information is a combination of the IP address and service type information or a combination of the IP address and the port number.

A case where the configuration information is a combination of the IP address and the service type information will be described below. In this case, the router control apparatus 105 registers to the router apparatus 102 a combination of the source IP address, the destination IP address (IP address 1), and the service type information of a packet from the Internet 103 as one entry. If the communication apparatus 101 which set the IP address 1 is connected to the LAN 104 when a configuration entry set by the router control apparatus 105 is effective, there may be a situation of being accessed by an unintended remote apparatus. Therefore, before starting service provision, the communication apparatus 101 transmits to the router apparatus 102 a deletion request for deleting a configuration entry set for relaying a packet to the received IP address 1.

Further, a case where a combination of the IP address and the port number is used as configuration information will be described below. In this case, the router control apparatus 105 registers to the router apparatus 102 a combination of the source IP address, the source port number, the destination IP address (IP address 1), and the destination port number of a packet from the Internet 103 as one entry. If the communication apparatus 101 which set the IP address 1 is connected to the LAN 104 when a configuration entry set by the router control apparatus 105 is effective, there is a risk of being accessed by an unintended remote apparatus. Therefore, before starting service provision, the communication apparatus 101 transmits to the router apparatus 102 a deletion request for deleting a configuration entry set for relaying a packet to the received IP address 1.

Further, although the determination is based on Fire Wall in the present exemplary embodiment, the basis of determination is not limited thereto but may be other network configurations such as Filtering.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-188603 filed Aug. 17, 2009, which is hereby incorporated by reference herein in its entirety.

What is claimed is:

1. A communication apparatus in a second network connected to a first network via a connection apparatus which transfers a request from the first network to the second network according to a setting for transferring, the communication apparatus comprising:
   a processing unit configured to perform processing in response to the request;
   a transmission unit configured to transmit to the connection apparatus, before activating the processing unit to perform processing, a deletion request for deleting the setting for transferring the request from the first network to the communication apparatus; and
   a rejection unit configured to reject an access from the first network in a case where the setting for transferring the request from the first network to the communication apparatus is undeletable by the deletion request.

2. The communication apparatus according to claim 1, wherein the transmission unit transmits a mapping acquisition request to the connection apparatus to acquire therefrom association information associating destination information from the first network with identification information of the communication apparatus in the second network, and
   wherein the communication apparatus further comprises a determination unit configured to determine the setting to be deleted by the deletion request, based on the association information transmitted by the connection apparatus in response to the mapping acquisition request.

3. The communication apparatus according to claim 1, further comprising an activating unit configured to activate the processing unit to execute a service when the setting for transferring the request from the first network to the communication apparatus is deleted in accordance with the deletion request.

4. A communication apparatus in a second network connected to a first network via a connection apparatus which transfers a request from the first network to the second network according to a setting for transferring, the communication apparatus comprising:
   a processing unit configured to perform processing in response to the request;
   a transmission unit configured to transmit to the connection apparatus, before activating the processing unit to perform processing, a deletion request for deleting the setting for transferring the request from the first network to the communication apparatus; and
   a control unit configured to change identification information of the communication apparatus in a case where the setting for transferring the request from the first network to the communication apparatus is undeletable by the deletion request.

5. A communication apparatus in a second network connected to a first network via a connection apparatus which transfers a packet from the first network to the second network according to a setting for transferring, the communication apparatus comprising:
   a processing unit configured to perform processing in response to a request;
   a transmission unit configured to transmit to the connection apparatus, before activating the processing unit to perform processing, a deletion request for deleting the setting for transferring the packet from the first network to the communication apparatus; and
   a rejection unit configured to reject an access from the first network in a case where the setting for transferring the packet from the first network to the communication apparatus is undeletable by the deletion request.

6. The communication apparatus according to claim 5, further comprising an activating unit configured to activate the processing unit to execute a service when the setting for transferring the request from the first network to the communication apparatus is deleted in accordance with the deletion request.

7. A communication method performed by a communication apparatus in a second network connected to a first network via a connection apparatus which transfers a request from the first network to the second network according to a setting for transferring, the communication method comprising:
   performing processing in response to the request;
   transmitting to the connection apparatus, before activating the processing to perform processing, a deletion request for deleting the setting for transferring the request from the first network to the communication apparatus; and
   changing identification information of the communication apparatus in a case where the setting for transferring the request from the first network to the communication apparatus is undeletable by the deletion request.

8. The communication method according to claim 7, further comprising:
   transmitting a mapping acquisition request to the connection apparatus to acquire therefrom association information associating destination information from the first network with identification information of the communication apparatus in the second network; and
   determining the setting to be deleted by the deletion request based on the association information transmitted by the connection apparatus in response to the mapping acquisition request.

9. The communication method according to claim 7, further comprising rejecting an access from the first network in a case where the setting for transferring the request from the first network to the communication apparatus is undeletable by the deletion request.

10. The communication method according to claim 7, further comprising activating the processing unit to execute a service when the setting for transferring the request from the first network to the communication apparatus is deleted in accordance with the deletion request.

11. A non-transitory storage medium storing a program readable by a computer in a second network connected to a first network via a connection apparatus which transfers a request from the first network to the second network according to a setting for transferring, the program comprising:
   performing processing in response to the request;
   transmitting to the connection apparatus, before activating the processing to perform processing, a deletion request for deleting the setting for transferring the request from the first network to the communication apparatus; and
   changing identification information of the communication apparatus in a case where the setting for transferring the request from the first network to the communication apparatus is undeletable by the deletion request.

12. The storage medium according to claim 11, further comprising rejecting an access from the first network in a case where the setting for transferring the request from the first network to the communication apparatus is undeletable by the deletion request.

13. The storage medium according to claim 11, further comprising activating the processing unit to execute a service when the setting for transferring the request from the first network to the communication apparatus is deleted in accordance with the deletion request.

14. A communication method performed by a communication apparatus in a second network connected to a first network via a connection apparatus which transfers a packet from the first network to the second network according to a setting for transferring, the communication method comprising:

performing processing in response to a request;
transmitting to the connection apparatus, before activating the processing to perform processing, a deletion request for deleting the setting for transferring the packet from the first network to the communication apparatus; and
rejecting an access from the first network in a case where the setting for transferring the packet from the first network to the communication apparatus is undeletable by the deletion request.

15. The communication method according to claim 14, further comprising activating the processing unit to execute a service when the setting for transferring the request from the first network to the communication apparatus is deleted in accordance with the deletion request.

16. A non-transitory storage medium storing a program readable by a computer in a second network connected to a first network via a connection apparatus which transfers a packet from the first network to the second network according to a setting for transferring, the program comprising:

performing processing in response to a request;
transmitting to the connection apparatus, before activating the processing to perform processing, a deletion request for deleting the setting for transferring the packet from the first network to the communication apparatus; and
rejecting an access from the first network in a case where the setting for transferring the packet from the first network to the communication apparatus is undeletable by the deletion request.

17. The storage medium according to claim 16, further comprising activating the processing unit to execute a service when the setting for transferring the request from the first network to the communication apparatus is deleted in accordance with the deletion request.

* * * * *